May 24, 1932. J. W. RATH 1,859,467
MEANS FOR IDENTIFYING PRODUCTS OF A PARTICULAR ORIGIN
Filed Sept. 14, 1928
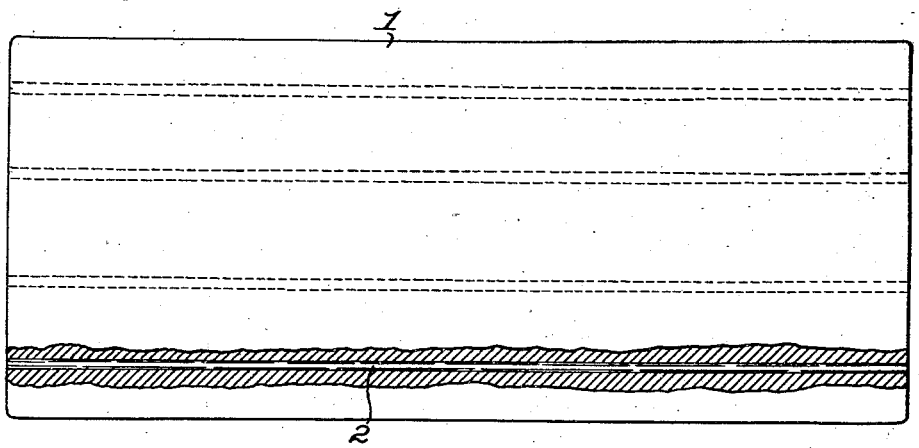
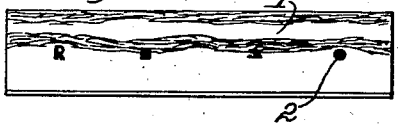
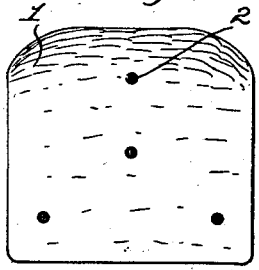
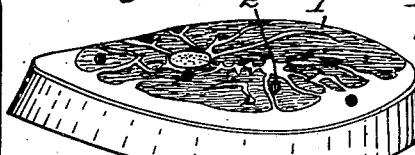
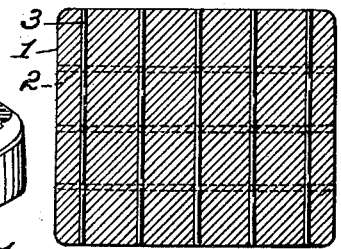
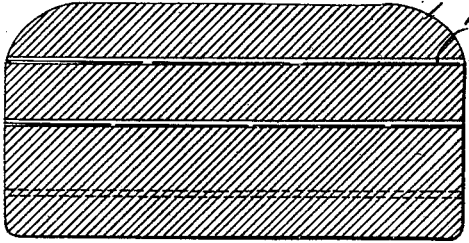
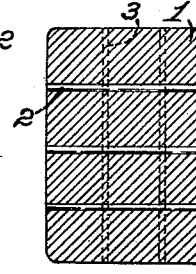
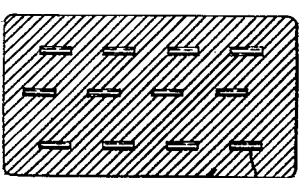
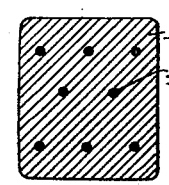
Inventor
John W. Rath,
By G. C. Kennedy
Attorney Patented May 24, 1932

1,859,467

UNITED STATES PATENT OFFICE

JOHN W. RATH, OF WATERLOO, IOWA

MEANS FOR IDENTIFYING PRODUCTS OF A PARTICULAR ORIGIN

Application filed September 14, 1928. Serial No. 306,000.

My invention relates to means and methods for identifying products as to their particular origin, and which consists in making such structural changes in a product that it will possess a physical characteristic of any desired nature, and of a persistent kind, symbolic of a certain origin or derivation, to afford means for identifying the product with the producer, whether the latter is classed as a grower, manufacturer, processor, or seller thereof.

The principal object of this invention is, therefore, to identify the product and protect the originator of the special food or other product against imitations or substitutes and prevent deceptions of purchasers and consumers.

Thus by a suitable method, instead of food losing its identity or origin, after having been prepared in the kitchen, the meat packer, baker or any other processor of food, as well as the fruit or vegetable grower may so mark his product that the consumer will be able to know that the food so marked is the product of a certain manufacturer or vender who possesses a certain identification mark used or associated therewith or therein, so that the product of others cannot be changed or substituted for the particular product so protected, thus safeguarding the originator, the purchaser and the consumer.

The object of this invention is the marking of food products such as bacon, hams, shoulder and all other cuts of pork and prepared meats and sausage, also beef, veal, mutton and other animal foods and the products thereof; also the products of bakers, such as bread, cakes, crackers and other bakery products or food prepared by caterers or others.
Another object is the introduction by pressure or otherwise, into the food product, or other goods, portions of an innocuous and edible substance in the case of foods, or characteristically differing insertions of substances in the case of other products, whether colored differently or otherwise rendered distinctive and symbolic, as may be predetermined for the particular case.

The distinctive insertions for identifying origin may be of any kind, whether of distinctive color or shapes or otherwise, which permit the consumer to recognize and identify the source of the combined product, and the insertions may be of a nature as to render them persistent after cooking or other particular processing by the consumer, so that the marks remain identifiable notwithstanding.

I have exemplified the above objects particularly as to food products in the different ways depicted in the accompanying drawings, in which Fig. 1 is a plan view of a slab of bacon, with a portion removed to display one of the identifying objects in full line elevation embedded therein and other such objects therein by dotted lines. Fig. 2 is an end elevation of said slab showing the ends of the inserted symbolic objects. Fig. 3 is a longitudinal section of a transverse slice of the slab including said objects. Fig. 4 is an elevation of one face of said slice after the cooking or frying thereof. Fig. 5 is a perspective view of a transverse slice of a ham showing the visibly embedded ends of identifying parts. Fig. 6 is a vertical longitudinal section and Fig. 7 an end elevation of a body such as a loaf of bread which likewise contains said identifying means. Figs. 8 and 9 are respectively a longitudinal and a cross section of any product, such as cheese or otherwise, showing a different relative arrangement of the distinctive objects therein. Figs. 10 and 11 are respectively a longitudinal and cross section of any body, in which the inserted objects are differently distributed or disseminated in a separated or fragmentary manner.

My invention is not restricted to the precise shapes or arrangements of the symbolic bodies thereof, nor to any special ingredients or compounding of said bodies, as the same may me modified or rearranged without departing from the spirit and scope of my invention, the various means shown being merely a few of those which may be used without attempting to show all of the forms or characteristics of such bodies or symbols in which the invention might be shown.

In Figs. 1 to 4 inclusive, a slab 1 of bacon is shown, uncooked, except that the rasher shown in Fig. 4 is represented as it may appear after frying. The numeral 2 denotes a plurality of inserted bodies of a symbolic character as to shape and relative arrangement.

In said Figs. 2 and 4, the cross sections of the bodies 2 are of different shapes, and in a desired number arranged in one relative plane, but all of said bodies may be of the same shape, or may be otherwise relatively distributed in the matrix. The bodies 2 and 3 of Figs. 8 and 9 are arranged in spaced tiers and staggered, while those of one tier are placed at a right angle relatively to the other tiers. In Figs. 10 and 11 the bodies 4 (corresponding to the bodies 2 or 3) are in alined spaced fragmentary units.

The emplacements of the bodies, 2, 3 and 4 are effected by an initial pressure of a hollow piercing member or members therethrough, and on the return or removal stroke of such members forcing, as by air pressure therein, a substance through such members into the elongated apertures provided thus in the slab. This substance may be of a flowable kind of any ingredient or color such as pink or red, which will agreeably contrast with the matrix. The substance of these bodies may be tinted beef fat or a cereal product for use with bacon or meats, having a higher melting point than the latter. The substance may also be a compound of edible gelatin, powdered egg albumen, and a harmless edible coloring matter which retains its color unchanged under ordinary cooking temperatures. An example of such a coloring is ponceau 3R, which is approved for such use by the Bureau of Animal Industry, meat inspection. In other foods, or other products, other substances may be used, suitable for association therewith.

The color, or the cross-sectional shapes, or both, are thus rendered distinctive from the matrix and are always clearly visible, whether before or after cooking, thus protecting the originator, as against fraudulent substitutions.

In producing insertions of a fragmentary or separately disseminated kind as in Figs. 10 and 11, any desired mechanical means may be employed, such means not being claimed herein. The means to be adopted may be varied according to the nature of the product.

When a slab or body of a product is cut across, as in Fig. 3, each piece will carry the distinctive symbols embedded therein, and therefore the object of the invention cannot be defeated by separation of portions of the body from the whole.

Having described my invention, what I claim as new, and desire to secure by Letters Patent, is:

1. The combination with an edible body, of an inserted continuous traversing symbolic body of an innocuous edible substance having a distinctive feature which is unaffected by cooking of the whole and traversing the edible body from side to side, the symbolic body thus serving as an indication of origin of the edible body and appearing in each slice across both.

2. An edible body having a suitable shape, and one or more traversing innocuous edible elements therein traversing it from side to side with distinctive shape of cross-section visibly differentiating them therefrom where both are cut across, and whose shape is unaffected by cooking, to thus serve as evidence of origin of the edible body.

3. An edible body, and a plurality of continuous traversing innocuous edible elements therein traversing it from side to side having a coloration different from the color of the edible body, which coloration is unaffected by cooking, and serves as evidence of origin of the edible body.

4. An edible body, and various differently shaped and colored rod-like elements embedded therein and traversing it from side to side, composed of innocuous edible substances in a desired relative arrangement, and unaffected in color or shape by cooking whereby each cross section of the whole displays portions of said elements similarly, and to thus indicate the origin of the edible body in each section.

5. An edible body of a nature requiring cooking for edibility, and embedded bodies therein and continuously traversing it from side to side of an innocuous edible nature, placed therein before cooking, and which have characteristics visibly differentiating them from their matrix and unaffected by such cooking, whereby they serve to indicate the source of origin of the edible body in each separated portion thereof.

6. The combination with an edible body of an edible identifying insert of relatively restricted cross section traversing the same transversely of the direction in which such body is normally sliced, said insert having as an ingredient a substance capable of retaining its distinguishing characteristics during and after the cooking operations normally undergone by said edible body.

In testimony whereof I affix my signature.
JOHN W. RATH.